R. PHILIPP.
MACHINE FOR REDUCING TURNING CHIPS AND THE LIKE.
APPLICATION FILED OCT. 25, 1919.
1,420,742.
Patented June 27, 1922.
3 SHEETS—SHEET 1.
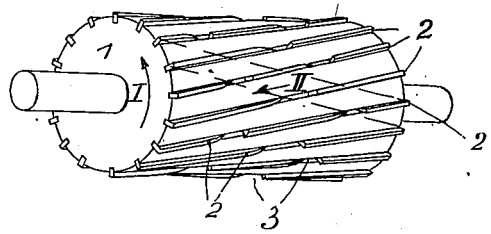
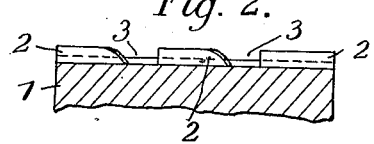
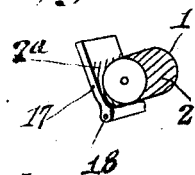
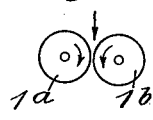
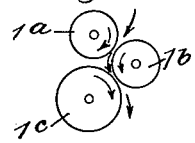
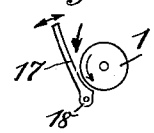
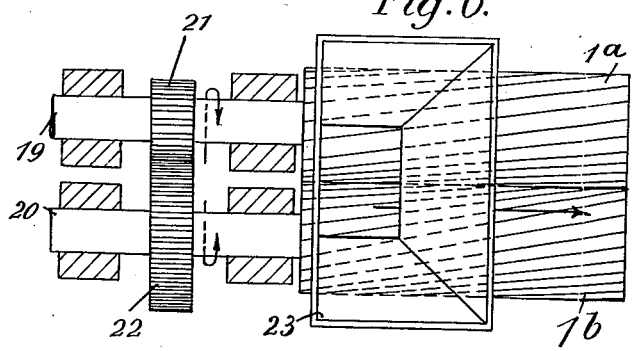
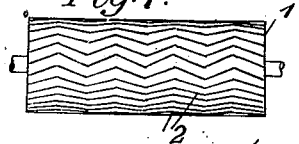
Inventor
Richard Philipp
by Lindley J Murray,
Attorney R. PHILIPP.
MACHINE FOR REDUCING TURNING CHIPS AND THE LIKE.
APPLICATION FILED OCT. 25, 1919.
1,420,742. Patented June 27, 1922.
3 SHEETS—SHEET 2.
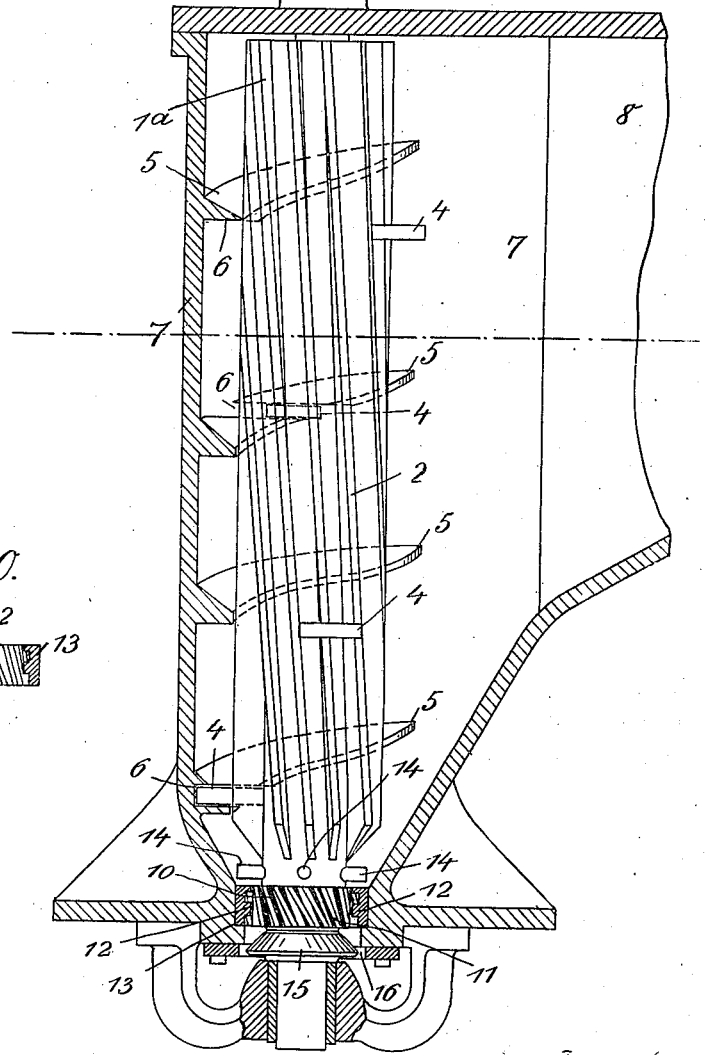

R. PHILIPP.
MACHINE FOR REDUCING TURNING CHIPS AND THE LIKE.
APPLICATION FILED OCT. 25, 1919.
1,420,742.
Patented June 27, 1922.
3 SHEETS—SHEET 3.
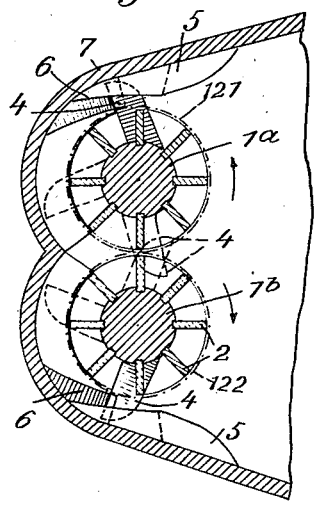
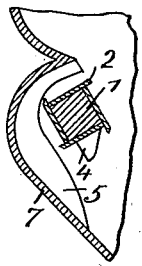
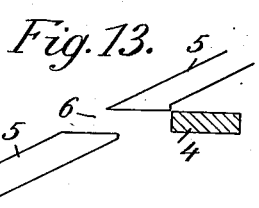
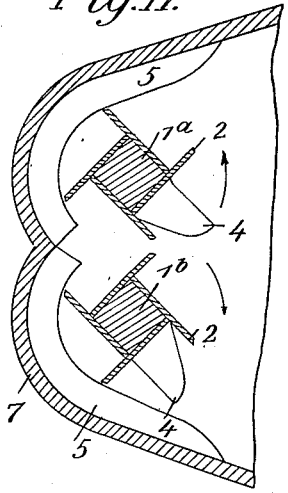
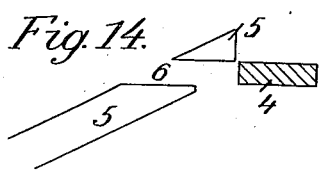
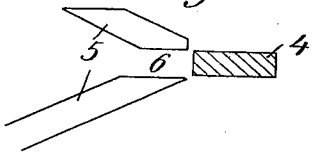
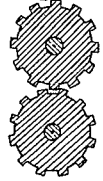
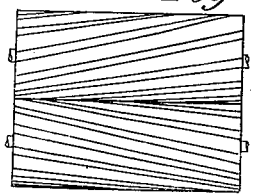
Inventor
Richard Philipp
by Lindley Murray
Attorney

UNITED STATES PATENT OFFICE.

RICHARD PHILIPP, OF EISENACH, GERMANY, ASSIGNOR TO THE FIRM MAGNET-WERK G. M. B. H. EISENACH SPEZIALFABRIK FUR ELEKTROMAGNET-APPA-RATE, OF EISENACH, SAXE-WEIMAR, GERMANY.

MACHINE FOR REDUCING TURNING CHIPS AND THE LIKE.

1,420,742.     Specification of Letters Patent.    Patented June 27, 1922.

Application filed October 25, 1919. Serial No. 333,378.

(GRANTED UNDER THE PROVISIONS OF THE ACT OF MARCH 3, 1921, 41 STAT. L., 1313.)

*To all whom it may concern:*

Be it known that I, RICHARD PHILIPP, a subject of the Grand Duke of Saxe-Weimar, Germany, residing at 36 Uferstrasse, Eisenach, Germany, have invented certain new and useful Improvements in Machines for Reducing Turning Chips and the like, for which I have filed applications in Germany March 19, 1917, December 24, 1917, April 16, 1918; Luxemburg June 11, 1918 (patented on same date); Denmark June 12, 1918; Norway June 15, 1918; Sweden June 15, 1918; Austria June 15, 1918; Switzerland June 18, 1918 (patented February 17, 1919); Netherlands June 19, 1918; Hungary July 8, 1918 (patented September 9, 1919); France June 27, 1918, and in Great Britain July 5, 1918, of which the following is a specification.

The chips produced in turning, drilling, planing and other working of metals of all kinds generally form a loose, bulky and very tangled mass, which requires much space, causes much trouble in transport and can therefore not be utilized with advantage in this form. The present invention relates to a machine by which such masses may be effectively disintegrated to a considerable extent and thereby greatly condensed.

The feature of the invention consists in this that the machine has a roller or rollers having knives extending substantially longitudinally to such roller or rollers, seizing the bales of chips which are thereby more or less disentangled, whereupon they are by the cooperation of such knife roller with one or more similar rollers or with suitably formed stationary counterparts further disentangled and separated, preferably while being conveyed towards the discharge end. The disentangling of the frequently closely matted or felted bales of chips is partly effected by the chips seized by the knives being wound around the knife rollers and, by the cooperation of helical, stationary strippers, being conveyed along the rollers to fresh effective disintegrating points. The disentangling of the chip bales is preferably aided by grippers fitted to the knife rollers, which grippers preferably project far beyond the knives and therefore penetrate deep into the chip bales, separating them and likewise conveying the chips to the severing points. The severing proper is effected by the knives, and partly also by the grippers passing the knives of the counter-roller or of the stationary counterpart, by shearing, breaking, crushing or tearing.

According to a modification of the method described the chips are fed to the severing points and to the discharge end of the machine, respectively by the knives on the roller being disposed obliquely to the axis of the roller and forming acute angles with the corresponding knives of the counter-roller or the stationary counterpart, respectively, so that an axial thrust is produced on the material under treatment. In such case the knives are preferably not made to extend continuously over the whole length of the rollers, but are provided with breaks, which will allow of lumps of chips choked between the knives clearing out therethrough.

The accompanying drawings show various constructional forms of the improved machine.

Fig. 1 is a knife roller as may be used in the machine.

Fig. 2 is a portion of a longitudinal section through such roller.

Fig. 3 shows diagrammatically a combination of two such knife rollers,

Fig. 4 a combination of three knife rollers,

Fig. 5 the combination of a knife roller with a stationary counterpart.

Fig. 5ª is a perspective view of a combination knife roller with a stationary counterpart.

Fig. 6 illustrates a special constructional arrangement of a pair of rollers according to Fig. 3.

Fig. 7 illustrates a modified arrangement of knives on the roller.

Fig. 8 is a further modification of a disintegrating machine in vertical section;

Fig. 9 is a horizontal section through the said machine, taken along line 9—9 of Fig. 8.

Fig. 10 shows a detail thereof.

Figs. 11 and 12 show two further modifications of said machine, and

Figs. 13, 14 and 15 are further modifications of parts thereof. Finally

Figs. 16 and 17 illustrate a still further modification of the machine.

In the modification according to Fig. 1 the cylindrical roller 1 is fitted on its circumference with grooves running obliquely to the axis of the roller, into which grooves the exchangeable knives 2 are inserted. These knives are each composed of two or three sections which are so disposed with intervening gaps 3 that the gaps in the one row of knives are opposite to knives in the following row.

Two or more such rollers as 1$^a$, 1$^b$ in Figs. 3 and 6 or 1$^a$, 1$^b$, 1$^c$ in Fig. 4 may cooperate, or a roller may cooperate with a stationary cutter-jaw as 17 in Fig. 5.

On the counterpart the knives are disposed obliquely in an opposite sense. On the surfaces of a pair of cooperating rollers they are quite identically arranged, as may be seen in Fig. 6, but of course the knives are crossing each other at the point of contact of the rollers, as may be seen from Fig. 6 and as indicated by the broken lines in Fig. 1, from which there may further be seen that when the roller 1 revolves in the direction of the arrow I and the counterpart is stationary or moves oppositely or in the same direction with lower circumferential speed, there will be produced, besides the shearing effect of the cooperating knife edges, also a thrust on the material under treatment in the direction of arrow II, Fig. 1, whereby such material will be gradually fed past the knife sections and be given the opportunity of passing between the knives through said gaps, when the machine inclines to become choked. By the gaps being alternated, the tendency of long turnings to wind upon the rollers, will be effectively frustrated. In order to prevent the chips from catching and thereby causing a choking, the knife sections are bevelled off, as shown in Fig. 2, at the ends opposite to the direction in which the material is pushed. These bevelled ends are sharpened like chisels.

If it be dispensed with that the material is discharged at the end of the rollers, the knives need not extend continuously in the same direction, but may, according to Fig. 7, be disposed in zigzag lines.

According to Figs. 3 and 6 the rollers 1$^a$, 1$^b$ are of same size. In the arrangement according to Fig. 4 a third roller 1$^c$ of a larger diameter has been added, which cooperates with the one roller 1$^b$ of the first pair. By such means it is possible to obtain a stepwise disintegration of the material. Fig. 5 illustrates the cooperating of a knife roller 1$^a$ with a jaw 17 which will be likewise fitted with knives 2$^a$, said jaw being preferably pivoted on a fulcrum 18 close to the working point, so as to allow of conveniently adjusting the space between the working parts of the machine. Also the rollers in the modifications according to Figs. 3 and 4, respectively, may be made adjustable to each other.

The direction of rotation of all cooperating rollers is shown as opposite to each other so that at the intake side for the material the knives approach each other. For obtaining the relative velocity for securing the shearing effect the circumferential velocities must in such case be different, as provided in Fig. 6, where the shafts 19, 20 of the rollers bear intermeshing gear wheels 21, 22 of different diameter.

In this construction material is supplied by means of a hopper 23 at the one end of the rollers 1$^a$, 1$^b$ which are journalled at this end only, whilst the other is quite free. The stock will, as far as it is not immediately disintegrated and falls through between the rollers, travel along the rollers in the direction of the arrow and so gradually come into the effective zone of the knives, without there being any danger of choking. By the same way also foreign bodies such as bolts, screws and other larger pieces of metal may clear out and be separately collected at the free end of the rollers.

By a suitable combination of several rollers according to Fig. 4 any degree of fineness of the stock may be secured without it being necessary, as heretofore, to employ several groups of individual machines.

In the modification shown in Figs. 8, 9 and 10 two knife rollers 1 are disposed vertically in a casing 7 to which the stock is supplied through a hopper 8 attached to the side of the casing, essentially along the whole length of the rollers in a chiefly radial direction. The two rollers are coupled to each other by gear wheels 121, 122 of equal diameter and are so driven that they revolve away from each other on the side towards the hopper 8. The casing 7 is provided on its inside with helically disposed webs 5 closely opposite to the knives 2 of rollers 1. These webs convey the chips fed onto them by the rollers, in a downward direction. By disposing them at a suitable steepness and providing them with sharp edges, the said webs may also be made to have a cutting effect in cooperation with the roller knives.

To the knife rollers are fitted at certain points in the gaps between the knife sections grippers 4 projecting toothlike beyond said knives. As shown in the drawing, these grippers extend close up to the wall of the casing and the cylindrical body of the counter rollers. The webs of the casing have corresponding breaks 6, through which the said grippers may pass during their rotation. Also all knives of the counter roller which in course of their rotation will meet said grippers must be provided with suitable breaks 3. The chips seized by said grippers 4 when these enter into the bale will be drawn outside around the rollers and be fed from the rear between the rollers, whereby by the cooperation of the knives 2 on the rollers with the knives of the corresponding counter roller or the webs 5 of the casing, respectively, the said chips are broken or cut.

The rollers may of course also be arranged to revolve at different speed, as in Fig. 6. When they revolve at the same speed, the knives may be arranged to engage with each other like helical wheels, as shown in Figs. 16 and 17, and exert by such means a shearing effect on the chips winding around the rollers.

The arrangement according to Fig. 11 essentially corresponds with that shown in Figs. 8 and 9, but the knives are fitted here to the flat surfaces of cutter heads 1 of a square section, instead of in grooves radially to rollers.

The knife rollers may advantageously be so disposed in the casing, that the space between the roller and the wall gradually decreases from the intake side to the cutting point. Thereby the chip bales are gradually compressed by the rotation of the roller; they ooze out from the spaces between the guiding webs of the casing, and the portions oozing forth are cut off by the knives. An arrangement of this kind is shown in Fig. 12, in which the cutter head is shown fitted eccentrically to a cylindrical part of the casing. The cylindrical form of the casing affords certain advantages, in so far as the machining of the same is simplified and the duplicate parts, for example the steel laggings of the webs, may all be of the same shape.

Also the grippers 4 may be formed as cutting devices, which cooperate with the edges of the breaks in the knives, of the counterparts, for instance the webs 5. For securing a double-sided cutting effect allowing of severing pieces of chip of the width of the grippers, the edges are preferably made in the manner shown in Figs. 13, 14 or 15. According to Fig. 14 the break 6 is arranged at the end of the web 5. According to Fig. 13, in which the break is in the web itself, the upper cutting edge is set-off, whilst according to Fig. 15 the continuation of the web has, for a short distance, a different direction, symmetrically to the web forming the opposite cutting jaw.

In the machine shown in Fig. 8 an attachment is fitted at the discharge end of the casing 7, said attachment having the object of further reducing the stock. The attachment consists of a grinder 10 resembling a milling cutter and fitted to each roller shaft 19, 20. Only one of these grinders is shown in Fig. 8 fitted to shaft 19, the construction being quite identical with respect to shaft 20.

The cutting edges of each grinder 10 co-operate with knifelike steep helical webs 12 of a ring like body 13 surrounding the grinder 10. This body is shown in detail in Fig. 10.

Above the grinder 10 between the latter and the lower ends of the knives 2 on the knife roller boltlike projections 14 are provided, which will agitate and mix up the chips so that these cannot settle and a well regulated discharge to the fine reducing attachment is secured. This agitating device may also be provided in machines having no fine reducing attachment, in order to ensure the discharging of the reduced chips out of the machine.

Below the grinder 10 a conical ring 15 is fitted on the roller shaft. This ring, which is made of hardened steel leaves a narrow annular space 16 between its outer edge and the corresponding part of the casing through which space the reduced stock may pass off. This arrangement allows of regulating the discharge and in connection therewith the degree of disintegration depending on the width of the said annular space 16, which may be varied by employing rings 15 of different size.

I claim:

1. A machine for reducing bulky metal chips, comprising a knife roller with knives extending substantially longitudinally thereto, a cutter-element cooperating with said knife roller, and means co-acting with said cooperating elements to disentangle the bales of chips, so that they may be seized and reduced by the knives.

2. A machine for reducing bulky metal chips, comprising a knife roller with knives extending substantially longitudinally thereto, a cutter-element cooperating with said knife roller, and means co-acting with said cooperating elements to disentangle the bales of chips and draw the chips between the co-operating elements.

3. A machine for reducing bulky metal chips, comprising a knife roller with knives extending substantially longitudinally thereto, a cutter-element cooperating with said knife roller, and grippers on said roller adapted to draw the chips from the bales and between the cooperating elements.

4. A machine for reducing bulky metal chips, comprising a knife roller with knives extending substantially longitudinally thereto, a cutter-element cooperating with said knife roller, and grippers on said roller projecting beyond the knives and adapted to draw the chips from the bales and between the cooperating elements.

5. A machine for reducing bulky metal chips, comprising a plurality of cooperating rollers with knives extending substantially longitudinally thereto, and means connected with said cooperating rollers to disentagle the bales of chips, so that they may be seized and reduced by the knives.

6. A machine for reducing bulky metal chips, comprising a plurality of cooperating rollers with knives extending substantially longitudinally thereto, and grippers on said rollers adapted to draw the chips from the bales and between the cooperating knives.

7. A machine for reducing bulky metal chips, comprising a plurality of cooperating rollers with knives extending substantially longitudinally thereto, but being disposed obliquely to the axis of the rollers in such a manner that the cooperating knives form acute angles with each other.

8. A machine for reducing bulky metal chips, comprising a plurality of cooperating rollers with knives extending substantially longitudinally thereto, but obliquely to the axis of the rollers in such a manner that the cooperating knives form acute angles with each other, and grippers on said rollers adapted to draw the chips from the bales and between the cooperating knives.

9. A machine for reducing bulky metal chips, comprising a plurality of cooperating rollers with knives extending substantially longitudinally thereto, and stationary cutter elements cooperating with said rollers to disentangle and reduce the chips.

10. A machine for reducing bulky metal chips, comprising a knife roller with knives extending substantially longitudinally thereto, a substantially helical cutter-element cooperating with said knife roller, and means connected with said roller to draw the chips from the bales and into the range of the knives and the helical cutter-element.

11. A machine for reducing bulky metal chips, comprising a knife roller with knives extending substantially longitudinally thereto, a cutter-element cooperating with said knife roller to disentangle and reduce the chips, the knives of said roller having breaks to give the chips the opportunity of passing therethrough.

12. A machine for reducing bulky metal chips, comprising a knife roller with knives extending substantially longitudinally thereto, a cutter-element cooperating with said knife roller to disentangle and reduce the chips, the knives of said roller having breaks alternating in neighbouring rows of knives.

13. A machine for reducing bulky metal chips, comprising a knife roller with knives extending substantially longitudinally thereto, a cutter-element cooperating with said knife roller to disentangle and reduce the chips, the knives of said roller having breaks, the knife sections formed by said breaks being bevelled and sharpened like a chisel at the end opposed to the feed direction of the material.

14. A machine for reducing bulky metal chips, comprising a knife roller with knives extending substantially longitudinally thereto, said roller being eccentrically arranged in the casing and revolving in the sense from the wide to the narrow portion of the space, whereby the chips drawn into such space are gradually compressed.

15. A machine for reducing bulky metal chips, comprising a knife roller with knives extending substantially longitudinally thereto, a cutter-element cooperating with said knife roller to reduce the chips, grippers on said roller projecting beyond the knives and adapted to draw the chips from the bales and between the cooperating elements, and breaks in the said cutter-element within the range of the grippers.

16. A machine for reducing bulky metal chips, comprising a knife roller with knives extending substantially longitudinally thereto, a cutter-element cooperating with said knife roller to reduce the chips, grippers on said roller projecting beyond the knives and adapted to draw the chips from the bales and between the cooperating elements, said grippers having sharp edges and cooperating with corresponding cutter-elements.

17. A machine for reducing bulky metal chips, comprising a knife roller with knives extending substantially longitudinally thereto, a cutter-element cooperating with said knife roller to reduce the chips, grippers on said roller projecting beyond the knives and adapted to draw the chips from the bales and between the cooperating elements, and breaks in the said cutter-element within the range of the grippers, said grippers and the edges of the breaks in the cutter-element being sharpened to obtain a shearing effect.

18. A machine for reducing bulky metal chips, comprising a roller fitted with exchangeable knives extending substantially longitudinally thereto, a cutter element cooperating with said knife roller, and means connected with said cooperating elements to disentangle the bales of chips, so that they may be seized and reduced by the knives.

19. A machine for reducing bulky metal chips, comprising a roller with grooves extending substantially longitudinally thereto, knives fitted in said grooves, and a cutter element cooperating with said roller.

20. A machine for reducing bulky metal chips, comprising a roller with grooves extending substantially longitudinally thereto, but obliquely to the axis, knife sections fitted in said grooves with intervening breaks, and a cutter element cooperating with said roller.

21. A machine for reducing bulky metal chips, comprising a roller with grooves extending substantially longtudinally thereto but obliquely to the axis, knives fitted in said grooves and a cutter-element cooperating with said roller and fitted with knives also arranged obliquely but in the reverse order of the knives on said roller to reduce the chips, the knives of the cooperating elements forming acute angles with each other.

22. In a machine for reducing turning chips and the like, a knife roller with knives extending substantially longitudinally thereto, a cutter-element cooperating with said knife roller to draw in and coarsely disintegrate the chips, and a fine reducing device arranged behind said coarse reducing means.

In testimony whereof I affix my signature in presence of two witnesses.

RICHARD PHILIPP.

Witnesses:
 EDMUND PAECHE,
 PAUL ZHIMERMANN.